United States Patent [19]

Goldstein

[11] Patent Number: 5,411,815
[45] Date of Patent: May 2, 1995

[54] TRANSPORT AND STORAGE VESSEL FOR ELECTRIC FUEL

[75] Inventor: Jonathan Goldstein, Jerusalem, Israel

[73] Assignee: Electric Fuel (E.F.L.) Ltd., Jerusalem, Israel

[21] Appl. No.: 122,718

[22] Filed: Sep. 15, 1993

[30] Foreign Application Priority Data

Sep. 15, 1992 [EP] European Pat. Off. ............ 92308403

[51] Int. Cl.6 ........................................... H01M 10/52
[52] U.S. Cl. ....................................... 429/50; 429/58; 429/70
[58] Field of Search ........................ 429/50, 57, 58, 70, 429/80

[56] References Cited

U.S. PATENT DOCUMENTS

| | | |
|---|---|---|
| 3,368,925 | 2/1968 | Denison et al. |
| 3,531,327 | 9/1970 | Moos |
| 3,655,451 | 4/1972 | Blossom et al. |
| 4,477,539 | 10/1984 | Struthers ........................ 429/19 |
| 4,745,038 | 5/1988 | Brown ............................ 429/27 |
| 4,788,111 | 11/1988 | Niksa et al. ................. 429/70 X |
| 5,171,647 | 12/1992 | Dean et al. .................. 429/57 X |

FOREIGN PATENT DOCUMENTS

| | | |
|---|---|---|
| 1553429 | 12/1968 | France. |
| 2084248 | 12/1971 | France. |
| 50-3849 | 2/1975 | Japan ........................... 429/57 |
| 1320211 | 6/1973 | United Kingdom. |
| 9203869 | 3/1992 | WIPO. |

OTHER PUBLICATIONS

"A Zinc Paste Primary Battery", Raymond Jasinski et al., 1046 Journal of the Electrochemical Society, 130 (1983), Mar., No. 3, USA (month unknown).

*Primary Examiner*—Stephen Kalafut
*Attorney, Agent, or Firm*—Helfgott & Karas

[57] ABSTRACT

The invention provides a transport and storage vessel containing a slurry of zinc and an aqueous alkaline solution utilizable as an electric fuel for a zinc-air battery, the vessel being provided with at least one hydrogen vent for venting any $H_2$ produced by said slurry.

12 Claims, 3 Drawing Sheets

TRANSPORT AND STORAGE VESSEL FOR ELECTRIC FUEL

The present invention relates to a storage and transport vessel for electric fuel. More particularly the present invention relates to a storage and transport vessel containing a slurry of zinc and an aqueous solution utilizable as an electric fuel and which can be transported as such in bulk or in prepared anode cassettes.

Various proposals have been made in the past for electrically powered vehicles. To date, for a number of reasons, electric vehicle systems have yet to become commercially viable generally, for urban highway applications. There have been proposals to employ zinc-air batteries for urban vehicle propulsion. An example is the following publication: Improved slurry zinc-air systems as batteries for urban vehicle propulsion, by P. C. Foller, Journal of Applied Electrochemistry 16(1986), 527–543.

"Machine Design" of Sep. 21, 1989 carried a review of electric batteries and vehicles and found that delivery vans were likely to be the first commercially produced electrically driven vehicles.

The Bedford CF electric van, using a lead-acid battery, is in production in the United Kingdom. It has a 50–60 mile range and a top speed of 50 mph, as reported by the Standard Handbook for Electrical Engineers.

Metal-air battery structures are described in the following publications: U.S. Pat. No. 4,842,963, entitled Zinc Electrode and Rechargeable Zinc-Air Battery; U.S. Pat. No. 4,147,839, entitled Electrochemical Cell with Stirred Slurry; U.S. Pat. No. 4,908,281, entitled Metal-air Battery with Recirculating Electrolyte; U.S. Pat. No. 3,847,671, entitled Hydraulically Refuelable Metal-Gas Depolarized Battery System; U.S. Pat. No. 4,925,744, entitled Primary Aluminum-Air Battery; U.S. Pat. No. 3,716,413, entitled Rechargeable Electrochemical Power Supply. In U.S. Pat. No. 3,592,698, entitled Metal Fuel Battery with Fuel Suspended in Electrolyte, there is described inter alia a method for circulating an electrolyte/metal fuel powder mixture through the battery; U.S. Pat. No. 4,126,733, entitled Electrochemical Generator Comprising an Electrode in the Form of a Suspension, relates to a similar subject using a circulated suspension of inert cores coated with an electrochemically active material. In U.S. Pat. No. 4,341,847, entitled Electrochemical Zinc-Oxygen Cell, there is described a method in which an electrolyte is circulated in the annular space between concentric electrodes.

Electrical energy storage systems are described in the following publications: U.S. Pat. No. 4,843,251 entitled Energy Storage and Supply; Energy on Call by John A. Casazza et al, IEEE Spectrum June, 1975, pp 44–47; U.S. Pat. No. 4,275,310, entitled Peak Power Generation; U.S. Pat. No. 4,124,805, entitled Pollution-Free Power Generating and Peak Power Load Shaving System; U.S. Pat. No. 4,797,566, entitled Energy Storing Apparatus.

Regeneration of spent zinc-containing alkaline electrolyte is described in a number of prior patents. For example, in U.S. Pat. No. 3,847,671 (mentioned above) whole spent electrolyte is subjected to electrolysis, when zinc deposited at the cathode is removed with a wiper blade. The thus-removed zinc is said to be substantially heavier than the electrolyte (35–40% KOH) and thus falls to the bottom of each cell. In U.S. Pat. No. 3,981,747, it is proposed to regenerate the spent zinc in an alkaline electrolyte by reaction with a strongly reducing metal, such as magnesium or aluminum, which displaces the zinc. In U.S. Pat. No. 4,341,847 (also mentioned above), spent zinc in the alkaline electrolyte is regenerated either by reversing the current and plating zinc on the anode, or by merely mechanically replacing zinc oxide particles by active zinc particles as described, e.g., in Israel Specification 10093, the teachings of which are incorporated herein by reference.

Metal-air and particularly zinc-air battery systems are known in the art and, due to their high energy densities, relative safety of operation and the possibility of ready mechanical recharging, such systems have been suggested as a power source for electrically propelled automotive vehicles. To date, for various reasons, such systems have yet to meet with significant commercial success.

For use in vehicle propulsion, it is highly desirable that a battery have a high specific energy, relative to its own weight. Lead-acid batteries produce only 30–40 Watt-hours/kilogram, and even the high-temperature Sodium-Sulphur type is rated at only 100 Wh/kg. Herein lies a central advantage of the Zinc-air battery, which is rated at 150–250 Wh/kg, higher than any other rechargeable battery available.

One of the principle drawbacks of battery systems as a power source for automotive vehicle propulsion, and particularly zinc-air battery systems, resides in the difficulty in achieving the combination of both a high continuous current drain, such as is needed for extended uphill driving, and short term high peak power output such as is needed for quick acceleration, while at the same time maintaining a high energy density and facilitating rapid rechargeability.

On the one hand, in order to achieve high continuous current drain a large reservoir of active anode material is needed. Due to space and other considerations this is generally best achieved by incorporation of a highly porous active anode element having large-surface active anodic material.

By contrast, in order to achieve high peak power output, i.e. the ability to provide a very high level of power for a short burst of time, studies have found that a tight interparticulate structure of the active anodic material is advantageous. This results in a low porosity with known powdered anodes and can drastically reduce the current capacity of the battery.

To date, in known-in-the-art battery systems much emphasis has been placed on achieving high capacity. Zinc anodes in various battery systems are generally formed in one of two broad families of processes: According to one family, particularly applicable to primary alkaline batteries, the anodes are constructed from finely powdered zinc typically produced by a thermal atomization process. The resultant zinc powder typically has a particulate size distribution of between 0.0075 to 0.8 mm and a surface area of between 0.2–0.4 $m^2/g$; it is generally combined with mercury, sodium carboxymethyl cellulose and KOH solution to form a gelled mass readily extruded into an anode form. Alternatively the powdered zinc may be sintered, or wetted with mercury and pressed into a plate. Porosity of the anode may be controlled by use of removeable pore forming materials such as $NH_4Cl$. The density of the zinc anode material precursor used for such methods is typically within the range of 2.5–3.5 gr/cc.

According to the second family of processes, exemplified by an anode proposed by Ross, U.S. Pat. No. 4,842,963, claimed to be particularly suitable for electrically rechargeable zinc-air batteries, the electrode is prepared by electrolytically depositing zinc on the internal surface of the foam electrode support to form a zinc electrode. Said patent however claims an improved zinc electrode for a rechargeable zinc-air battery comprising an outer frame, a porous foam electrode support within said frame having zinc deposited thereon and treated prior to the deposition of zinc thereon to inhibit the formation of zinc dendrites on the external surface thereof, and means within said outer frame for circulating an alkaline electrolyte through the interior of said treated zinc-coated porous foam, and a battery system which requires the inclusion of circulation means for a circulating alkaline electrolyte through the interior thereof is not practical or desirable.

At typical current densities it has been found that zinc-air batteries in which the anodes are constructed according to the above methods fail to provide a combination of rapid rechargeability, high current capacity and high peak power output. Hence it would be desirable to provide an anode capable of providing a battery with all of these attributes, i.e. high current density, rapid rechargeability, high current capacity and high peak power output.

In an effort to further increase the advantages of using zinc-air battery systems for electro-automotive propulsion, it has now been proposed in copending application to employ a mechanically rechargeable battery system comprising a rigid anode designed to be rapidly removed and replaced on a periodic basis at dedicated service stations specifically equipped for the purpose. The spent anodic material, which after use has been oxidized, may then be recycled external to the battery for later reuse in other batteries. To facilitate recycling of the active anodic material, it is necessary to separate the spent anodic material from the other anode components.

In Israel Specification 100903 there is described and claimed an improved zinc battery anode, particularly for zinc-air batteries, featuring a substantially planar skeletal frame comprising conductive metal having a portion of its surface area formed as open spaces, and an active zinc anode element encompassing the skeletal frame, and said active anode element formed of a slurry of porous granules comprising zinc, impregnated with and suspended in an electrolyte, compacted under pressure onto the skeletal frame.

Said specification however does not teach or suggest a method for transporting such anodes and storing them for extended periods of time.

Moreover there is a problem also with transporting and storing slurry in bulk for on-site filling of anodes with charged slurry or off-loading spent slurry.

With this state of the art in mind there is now provided according to the present invention a transport and storage vessel containing a slurry of zinc and an aqueous alkaline solution utilizable as an electric fuel for a zinc-air battery, said vessel being provided with at least one hydrogen vent for venting any $H_2$ produced by said slurry.

The invention also provides a transport and storage vessel for metal-air battery anode cassettes, said vessel being internally compartmentalized for retaining a plurality of anode cassettes and being provided with entry and exit ports for introducing and draining KOH solution, as well as with hydrogen vents for venting $H_2$.

Electric fuel is primarily a slurry of zinc particles and KOH solution with optional additives. In battery refuelling, anode cassettes containing a pre-determined quantity of slurry pressed into each individual copper-based current collector, are inserted into each individual cell of the zinc-air battery, and the cells are topped up as required with KOH solution. Cassettes containing spent slurry are previously withdrawn from the battery for regeneration.

Thus the present invention provides both means for (a) storing/transporting cassettes containing slurry, and (b) storing/transporting the slurry in bulk for on-site filling of cassettes with charged slurry, or off-loading spent slurry from cassettes.

The chemical safety constraints in storage/transport deal essentially with the tendency of the KOH-wetted slurry to gas flammable hydrogen according to the reaction $Zn + H_2O = ZnO + H_2$ or to be oxidized by oxygen of the air according to the reaction $2Zn + O_2 = 2ZnO$ especially if in contact with foreign metal (self discharge), or (if left exposed) the tendency to dry out. KOH solution is also a chemical hazard due to its caustic properties.

In the case of anode cassettes the vessel which could be of plastic or metal lined with plastic, is internally fitted with a racking arrangement to hold in place the anode cassettes. The vessel would be fitted with access hatches for removal of the casettes (e.g., by robotic means). Additional features are entry and exit pipes for KOH fill/drain and flush, ports for inert gas flushing (e.g., nitrogen) to remove air, hydrogen vent plugs to allow safe removal of hydrogen build-up and a layer of KOH covering the cassettes. Hydrogen vent plugs are well known from vented cell lead-acid technology. The vent plug may comprise a conventional one-way lead-acid battery baffle valve that lets small amounts of accumulated hydrogen gas vent into the surrounding air. Special units are also commercially available that catalytically combine hydrogen with excess oxygen from the air in a catalyst bed to give water vapor $2H_2 + O_2 = 2H_2O$, virtually eliminating the potentially explosive hydrogen.

In the case of slurry storage/transport, the vessel would be supplied without racking, appropriate to transportation and dispensing of a particular zinc/KOH solution slurry. For example, the inner space of the vessel might be narower at the base than at the top while the pipes would be of sufficient diameter to allow facile removal/insertion of charged or discharged slurry e.g., by connection to a slurry pump.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
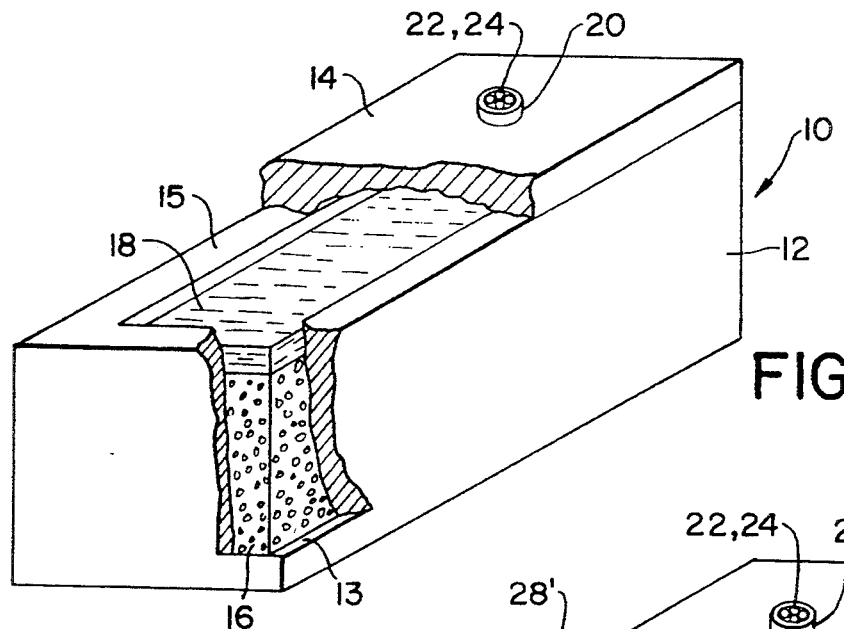
FIG. 1 is a perspective, partially fragmented view of a first embodiment of the vessel according to the invention.

There is seen in FIG. 1 a transport and storage vessel 10 usable for the components of a zinc-air battery. The figure shows a substantially square cross-section elongated container 12 provided with an internally-domed, sealed cover 14. The near square cross-section gives a high capacity/wall area ratio, while the dome cover facilitates hydrogen venting and resists gas pressure.

The base 13 of the container 12 can advantageously be made slightly narrower than its upper face 15.

The container 12 can be suitably cast from a plastic. Particularly suitable is polypropylene, which combines low weight and toughness with excellent chemical resistance.

Figure 2:
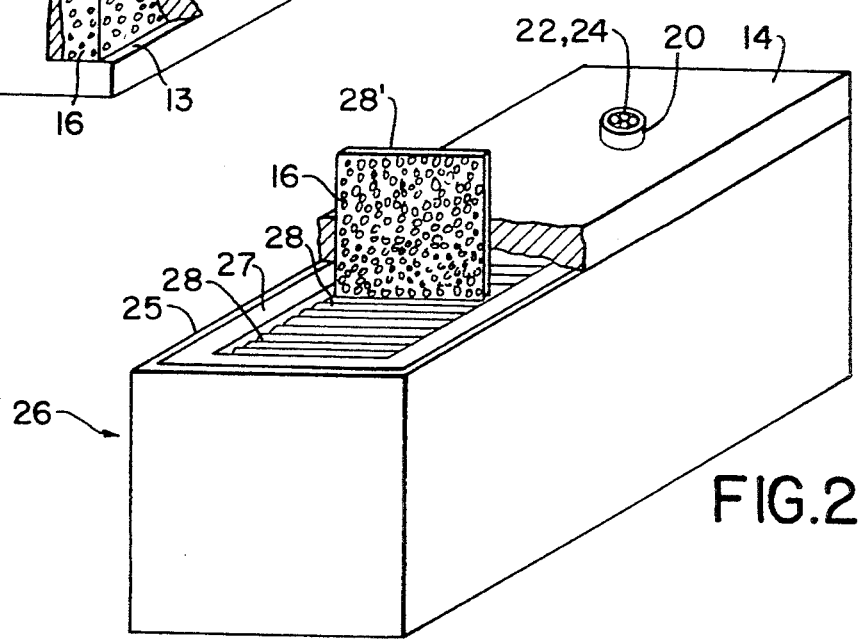
FIG. 2 is a perspective, partially fragmented view of a second embodiment of the vessel, showing a current-collecting frame partially withdrawn.

A further suitable construction for the container 12 is an outer shell of metal and an inner liner of plastic, shown in FIG. 2.

The vessel 10 contains a slurry of zinc 16 and an aqueous alkaline solution 18 utilizable as an electric fuel for a zinc-air battery. Preferably the aqueous alkaline solution 18 comprises KOH.

Attached at the highest point of the cover 14 is at least one hydrogen vent 20, as shown in FIGS. 1 and 2 has a surface which at least partially projects from the surface of the cover 14 into the air surrounding the vessel, for venting any $H_2$ gas produced by the slurry 16. Where the vessel 10 is to be used in an open area, the vent 20 may be fitted with a conventional one-way baffle valve 22 that allows the small amounts of accumulated hydrogen gas which are emitted to escape into the surrounding air. If the vessel is intended to be used in an enclosed space, it is better to use in the vent 20 a catalytic gas recombining unit 24, as commercially available for example from the Hydrocap Corp, Miami, Fla. The unit 24 combines oxygen from the surrounding air with the emitted hydrogen, producing water vapour and heat and virtually eliminating the potentially explosive hydrogen.

Figure 5:
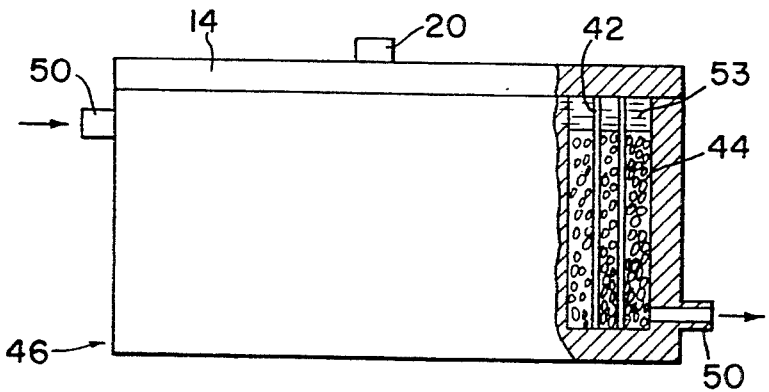
FIG. 5 is a partially fragmented front elevation of a compartmentalized vessel provided with electrolyte ports.

Preferably said vessel is also provided with an entry and exit port (not shown) for introducing and draining slurry similar to parts shown in FIG. 5.

FIG. 2 shows a transport and storage vessel 26 generally similar to the vessel 10, but provided with an outer metal casing 25 and an inner liner of plastic 27.

The zinc slurry 16 is retained in a plurality of individual current-collecting frames 28, one of which 28' is shown for illustrative purposes as being partially withdrawn from the vessel 26.

Preferably the slurry 16 is compacted as a substantially rigid mass on each frame 28.

For example, the frame 28 can suitably be 25 centimeters square and 7 millimeters thick, and will weigh approximately 500 gram. A 2 ton transit vehicle powered by a zinc-air battery having 300 such frames will have available about 50 kilowatt hours of energy, allowing a driving range of 400 kilometers and being able to achieve a top vehicle speed of about 70 miles per hour. It is to be noted that such a battery pack will weigh only about 220 kg, and yet will provide power comparable to the internal combustion engine normally fitted to a vehicle of this size.

Figure 3:
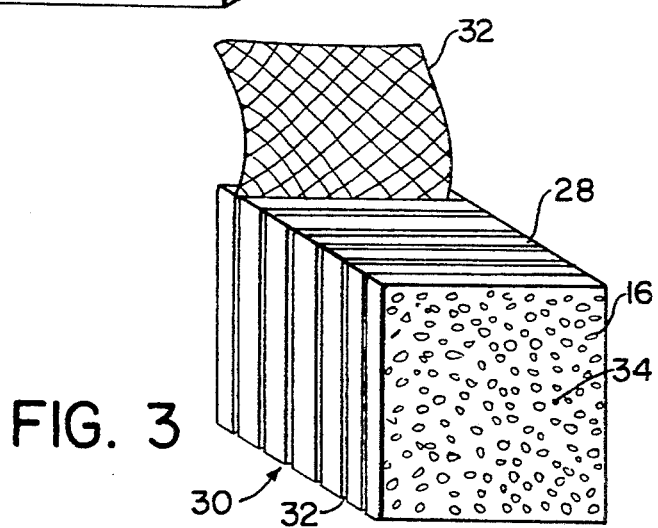
FIG. 3 is a perspective view of a preferred embodiment of the frames and separators, one separator being shown partly withdrawn for illustrative purposes.

There is seen in FIG. 3 a preferred embodiment of the frames 28 as used in the transport and storage vessel 10 or 26.

The frames 28 are arranged in a row 30, and there is further provided between each pair of adjacent frames at least one external electrolyte-permeable separator 32, adjacent to and protecting the surface of a major face 34 of the rigid mass of compacted slurry 16.

One separator is shown partially withdrawn for illustrative purposes.

A suitable separator 32 is easily made from commercially available low-cost plastic netting, made of any plastic not attacked by the alkline electrolyte, for example nylon, PVC, polypropylene or fluoropolymers.

Figure 4:
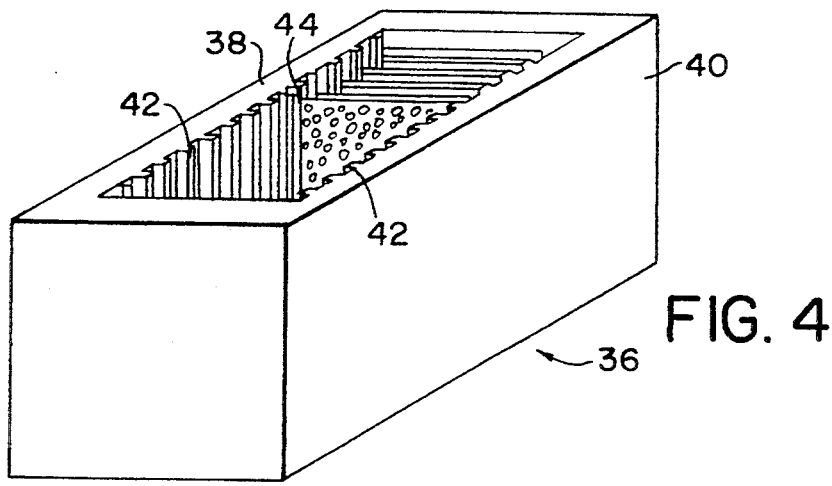
FIG. 4 is a perspective view of a partially-filled compartmentalized vessel with its cover removed.

FIG. 4 shows a partially-filled internally compartmentalized transport and storage vessel 36. The cover is not shown in order to reveal inner parts.

In the embodiment it is shown that the vessel side walls 38, 40 are provided with vertical-axis ridges 42 for retaining a plurality of slurry-containing anode cassettes 44.

Separators as described with reference to FIG. 3 are consequently not required, and any or all cassettes 44 can be easily lifted out of the vessel 36 and replaced therein.

FIG. 5 shows an internally compartmentalized transport and storage vessel 46 for retaining a plurality of anode cassettes 44. The vessel 46 is similar to the vessel 36.

However the vessel 46 is provided with an entry port 50 and an exit port 52 for introducing and draining the aqueous alkaline solution 53 serving as the electrolyte.

As will be understood, this arrangement allows for filling, adding or exchanging electrolyte without opening the vessel.

As before, there is also provided at least one hydrogen vent 20 for venting $H_2$.

Figure 6:
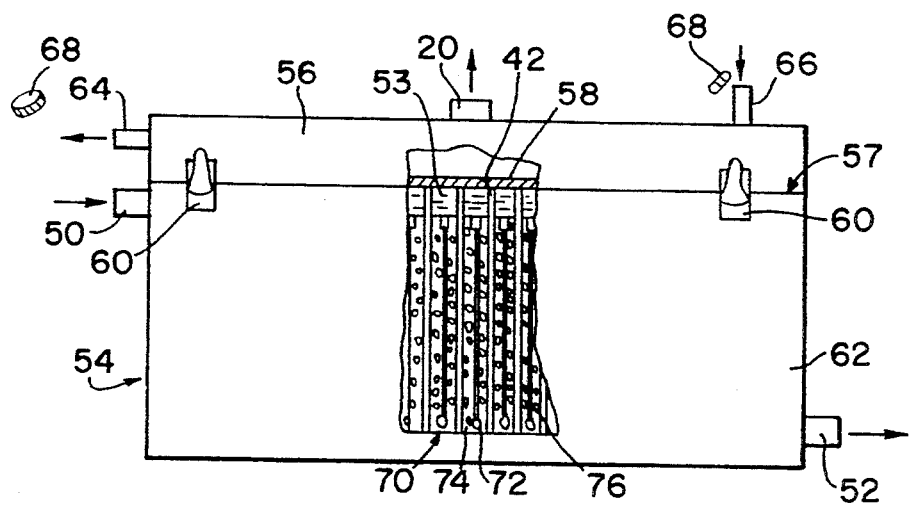
FIG. 6 is a partially-fragmented front elevation of a similar compartmentalized vessel provided with further ports and an access hatch.

FIG. 6 shows a compartmentalized transport and storage vessel 54, also similar to vessel 36, but provided with further ports and an access hatch 56.

An air-tight access hatch 56 for facilitating the insertion and removal of cassettes 70 therethrough covers the upper open face 57 of the vessel 54.

A seal element 58 is provided as well as latching means 60 for vessel 54.

In this preferred embodiment there is further provided one port 64 for air removal and at least one port 66 for inert gas flushing. Nitrogen is suitable for use as a flushing agent. As this gas is slightly lighter than the air it is intended to remove and replace, the port 66 is positioned at the highest point of the hatch 56. Air is allowed to exit through the port 64 positioned at a lower point. Both ports 64, 66 are provided with a removable closure 68 to prevent ingress of air and loss of electrolyte 53.

Preferrably there are provided and held in the vessel 54 a plurality of metal-air battery anode cassettes 70. Each cassette 70 has a substantially planar skeletal frame 72 comprising conductive metal. A portion of the cassette surface area is formed as open spaces. An active zinc anode element 74 encompassed the frame 72, the anode element 74 being formed of a slurry 76 of porous granules comprising zinc, impregnated with and suspended in an electrolyte 53, and compacted under pressure to form an integral unit with the skeletal frame 72.

Figure 7:
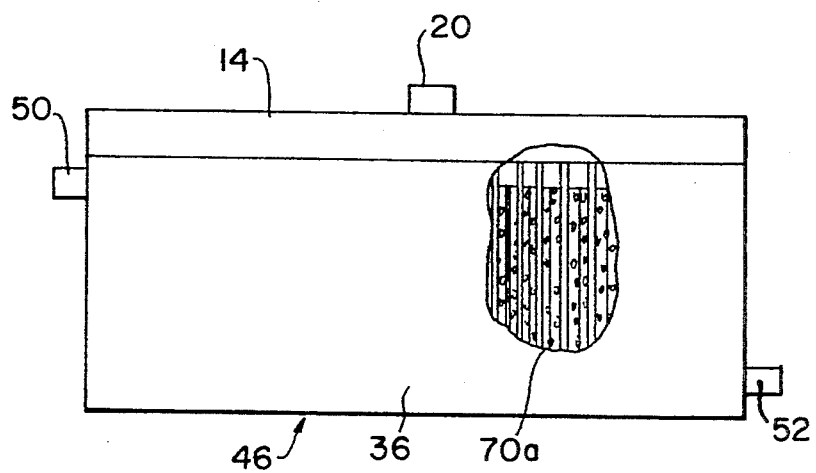
FIG. 7 is a partially-fragmented front elevation of the same vessel containing pre-dried cassettes.

FIG. 7 shows the transport and storage vessel 46 in combination with a plurality of cassettes 70a. Cassettes 70a are identical to cassettes 70, except that they are pre-dried for transport, prior to on-site loading and battery activation with water or with an electrolyte such as dilute KOH. Such a non-activated arrangement is suitable for extended storage.

An arrangement wherein the vessel 46 and its contents form a ready to use battery unit has been described with reference to FIG. 6. The vessel contains an electrolyte 53, preferably KOH based slurry, which encompasses, wets and enters the hollows of the cassettes 70.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A rigid reusable transport and storage vessel containing a slurry of zinc particles and an aqueous alkaline solution utilizable as an electric fuel for a zinc-air battery, said vessel being provided with at least one hydrogen combination device having an external surface at least part of which projects into the air surrounding the vessel for venting any $H_2$ produced by said slurry for contact and combination at said external surface with oxygen in the air surrounding said vessel, whereby contact of the $H_2$ internally generated and emitted from said vessel with the oxygen in the air surrounding said vessel eliminates potentially explosive hydrogen.

2. The transport and storage vessel as claimed in claim 1, wherein said slurry is retained in a plurality of individual current-collecting frames.

3. The transport and storage vessel as claimed in claim 1, wherein said slurry is compacted as a substantially rigid mass on a plurality of current-collecting frames.

4. The transport and storage vessel as claimed in claim 1, wherein each of said frames are further provided with at least one external electrolyte-permeable separator adjacent to and protecting a surface of said rigid mass of compacted slurry.

5. The transport and storage vessel as claimed in claim 1, wherein said aqueous alkaline solution comprises KOH.

6. The transport and storage system as claimed in claim 1, wherein said vessel is internally compartmentalized for retaining a plurality of slurry-containing anode cassettes.

7. A rigid reusable transport and storage vessel for retaining a plurality of slurry containing anode cassettes, said vessel being internally compartmentalized for retaining said plurality of anode cassettes and being provided with entry and exit ports for introducing and draining an aqueous alkaline solution, as well as with hydrogen vents, said vents being provided with an external surface at least part of which projects into the air surrounding said vessel for venting $H_2$ produced by said slurry for contact and combination at said external surface with oxygen in the air surrounding the vessel, whereby contact of the $H_2$ internally generated and emitted from said vessel with the oxygen in the air surrounding said vessel eliminates potentially explosive hydrogen.

8. The transport and storage vessel as claimed in claim 7, further comprising at least one air-tight access hatch for facilitating the insertion and removal of cassettes therethrough.

9. The transport and storage vessel as claimed in claim 7, further comprising at least one port for air removal and inert gas flushing.

10. The transport and storage vessel as claimed in claim 7, in combination with a plurality of metal-air battery anode cassettes, said cassettes featuring a substantially planar skeletal frame comprising conductive metal having a portion of its surface area formed as open spaces, and an active zinc anode element encompassing said skeletal free, said anode element being formed of a slurry of porous granules comprising zinc, impregnated with and suspended in an electrolyte, and compacted under pressure to form an integral unit with said skeletal frame.

11. The transport and storge vessel as claimed in claim 7, wherein said cassettes are pre-dried for transport, prior to on-site loading and battery activation with water or with dilute KOH.

12. The transport and storage vessel as claimed in claim 7, and further containing KOH slurry zinc particle therein.

* * * * *